United States Patent Office 3,207,613
Patented Sept. 21, 1965

3,207,613
MODIFIED PROTEINACEOUS MATERIALS AND
METHOD FOR MAKING THEM
Richard E. Merrill, Wakefield, Mass., assignor to Arthur
D. Little, Inc., Cambridge, Mass., a corporation of
Massachusetts
No Drawing. Filed June 4, 1962, Ser. No. 199,594
18 Claims. (Cl. 106—135)

This invention relates to a process for modifying protein-containing materials and more particularly to materials containing collagen such as glues and gelatins. This invention also discloses a novel type of glue.

Protein-containing materials are widely used in chemical compositions, for example in preparing adhesives, coatings, paints and the like. Among these, the collagen-containing materials are quite important industrially. Such materials comprise the chief constituents of connective tissues and the organic substances of bones and have long been used in the form of gelatins or glues for many purposes. Gelatins find many uses in pharmaceuticals, photographic emulsions, culture mediums, clarifying processes and the like; while glue has long been known to be a good adhesive, particularly for porous materials such as paper, cloth and the like. A number of ways have been found to modify these naturally occurring materials to give them certain additional and desirable properties including greater water insolubility, physical strength through cross-linking and the like. Among the attainments of the method of this invention is the modification of collagen-containing materials to make them true or nearly true thermoplastic materials, a modification heretofore unknown. The attendant advantages of so modifying glue in particular will be discussed below in a detailed description of this invention.

The method of modifying protein, and collagens in particular, as described herein is applicable to protein-containing materials, and in particular to collagen-containing materials, the latter being primarily gelatins and glues. The detailed description of this invention will, however, be given in terms of modifying glues; but it is not meant to limit the method to this class of collagens. Examples of treating gelatins as well as other proteinaceous materials will be given to illustrate the wide application of this method. The description in terms of glue is used merely for clarity of presentation.

Although glues have found wide acceptance as adhesives they possess certain inherent disadvantages in their use in this role. Heretofore it was always necessary to apply glue to a substrate from a water solution. Likewise the glue had to be activitated by the application of moisture or a limited amount of water. In applying glue from a water solution a substrate such as paper tends to curl, particularly if it is lightweight material and does not possess sufficient strength to resist curling. To avoid this two well-known techniques have been used, namely the actual breaking of the glue film after drying on a substrate or the application of the glue in a definite pattern which left uncoated areas between the glue-coated areas on the substrate. Finally, glues of commerce derived from proteinaceous materials have been limited with respect to the type of surfaces to which they will adhere. For example, it has never been possible to use these glues to adhere to certain plastics and to some of the relatively non-porous, smooth surfaces. In the following description the term "glue" will be used to describe a material derived from protein, whether animal or vegetable. Thus it will be distinguished from synthetic resins which are as adhesives and sometimes generally called glues.

In order to avoid some of the disadvantages associated with glues, hot melt synthetic resin adhesives were developed. These are thermoplastic materials which can be converted by heating to a liquid and then applied to a substrate in this state. This, of course, eliminated the use of solvent and its subsequent removal, and at the same time materially reduced the tendency of the substrate to curl. However, these synthetic resin adhesives also possessed certain inherent disadvantages among which may be listed high cost and the inability to be easily removed with water from a substrate since they were inherently water insoluble.

It will be apparent that it would be desirable if one could combine the advantages of protein-derived glue (good adhesion, moisture activatable and low cost) with the advantages of synthetic hot melt resin adhesives (elimination of solvents, heat activatability, activity on a wider variety of substrates and less tendency to curl). It should then be possible to make an adhesive which would have the advantages associated with glue and with hot melt resin adhesives while at the same time avoiding the major disadvantages associated with each of these. I have found that it is possible to treat glues with certain reactants to make them thermoplastic so that they may be applied as a hot melt, while at the same time retaining the advantages including water or moisture-activatability and good adhesion which are associated with unmodified glues.

It is therefore a primary object of this invention to provide a modified proteinaceous material. Another primary object is to provide a glue of the character described which can be applied as a hot melt without the use of solvents or dispersing liquids and which at the same time can be activated by either heat or moisture. It is another object to provide a glue which does not curl when applied to a substrate and hence which requires no special treatment to either cure or prevent curling. It is another object of this invention to provide a glue of the character described which is capable of adhering to a wider range of substrates than natural unmodified glue. It is another object to provide a glue adhesive which can be readily washed off a substrate so that the substrate material may be recovered. It is still another object of this invention to provide a modified glue which lends itself to the incorporation of a number of modifying agents to impart to it desired chemical and physical properties normally not associated with glues of commerce derived from proteinaceous sources.

It is another primary object of this invention to provide a method for treating protein-containing materials, including collagen-containing materials, and particularly glues, to impart to them desired physical and chemical properties. It is another object of this invention to provide a method of the character described for making a thermoplastic glue suitable for desposition on a substrate in the form of a hot melt. It is yet another object to provide a method for preparing water-activatable or moisture-activatable/heat activatable adhesives from glues. It is another object to provide a method for coating a substrate with animal-derived glue from a hot melt without the use of liquids (e.g., solvents) which subsequently must be removed. Other objects of the invention will in part be obvious and will in part be apparent hereinafter.

The invention accordingly comprises the several steps and relation of one or more of such steps with respect to each of the others, and the article possessing the features, properties and the relation of elements which are exemplified in the following detailed disclosure and the scope of the invention will be indicated in the claims.

The method of this invention for treating proteinaceous materials may be briefly defined as reacting the proteinaceous material to be treated at an elevated temperature (no higher than about 200° C.) with a treating or modifying reactant having the general formula

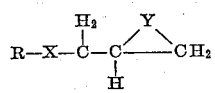

wherein R is an organic radical chosen to control the final physical properties of the modified proteinaceous material; X is selected from the group consisting of —O— and —CH₂—; and Y is selected from the group consisting of —O—, —NH— and —S—. In one preferred embodiment of this invention in which animal-derived glues are rendered thermoplastic, the modifying reactant is a substituted glycidy ether of the formula

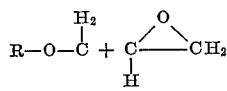

where R is phenyl or certain substituted phenyls.

The modifying reaction is carried out until essentially no more of the modifying reactant is reacted with the proteinaceous material being treated. Reaction times to achieve this are generally of the order of about six hours.

The protein-containing material, the reactants usable for treating them and the additional modifying agents which may be used will be discussed in detail below. Reaction conditions and examples will then be presented to further illustrate the method and product of this invention.

PROTEIN-CONTAINING MATERIALS

Glue is derived from a number of different animal tissues, bones and hide, as well as from fish, and each of the types of glues produced has its own particular characteristics making it suitable for a variety of different applications. In like manner there are a number of different types of gelatins classed with respect to their source or to their ultimate use. The actual process for the isolation of glues or gelatin may be carried out in an acid or basic medium and the resulting glues are known as acid precursor or alkaline precursor glues. As will be apparent from the examples given below all known types of glues may be treated by the process of this invention. Some are of course more desirable than others for forming true thermoplastic hot melt adhesive but all are modified with respect to their physical properties. Therefore the method of this invention is applicable to all types of animal-derived glues no matter how processed or what their derivation may be. A wide variety of glues are illustrated in the examples.

In addition to having characteristic properties depending upon their derivation or the process by which they are formed, glues vary widely as to their grades which may be defined by their so-called "jelly value" expressed in "bloom grams" following procedures adopted by the National Association of Glue Manufacturers. It has been found that glue having widely varying jelly values can be treated in accordance with the method of this invention. Likewise all types of gelatins irrespective of their derivation or the process by which they are formed are amenable to the treatment of this invention.

Finally, materials containing proteins other than the collagens can also be treated, not necessarily to render them thermoplastic but to impart to them other characteristics such as decreased softening points, decreased solubility and the like. The examples will show the treatment of such proteinaceous materials as casein (derived from milk), zein (derived from corn), soya protein and keratins such as hog bristles, chicken feathers and the like.

Thus, the method of this invention is applicable to protein-containing materials irrespective of their derivation, i.e., animal or vegetable. These proteinaceous materials are known to contain active hydrogens in the form of

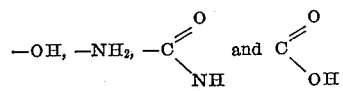

the last named furnishing only a small number of these active hydrogens. Another characteristic associated with the protein molecules is th tendency to coil up on themselves. The presence of the active hydrogens in protein molecules and their tendency to coil will be seen to be important in presenting a brief possible explanation of the effect the modifying reactants of this invention have on them.

THE MODIFYING REACTANTS

The reactants used to treat the proteinaceous materials to be modified may be generally defined as compounds having the structure

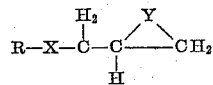

where R is an organic radical which may be cyclic or acyclic, X is —O— or —CH₂—, and Y is —O—, —NH— or —S—. An examination of this generic formula will show that there are three groupings (R, X and Y) which either enter into the reaction or determine the properties of the modified proteinaceous material. The R grouping appears to be the primary factor in determining the degree to which the original physical properties of the proteinaceous material are modified and in this role it may be postulated to exert its influence through spatial considerations. The X grouping may be postulated to be the bridge between the R group and the remaining or reactive portion of the modifying reactant. Finally Y serves as the means by which the modifying reactant is joined to the protein molecule through the active hydrogens of the latter. Since —O—, —NH— and —S— are all known to be highly reactive with active hydrogens, any of these may serve as the point of linkage to the protein molecule.

Although I do not wish to be bound by a theory, it seems plausible to assume that the protein molecule is attached through the Y grouping to the modifying reactant and that the R grouping, depending upon its relative size, once introduced, lessens or perhaps even eliminates the self-coiling of the protein molecule. It has been observed that the degree of water solubility or swellability and the degree of thermoplasticity of the treated material are related to the size and shape of the organic radical represented by R.

By limiting the reactive grouping Y to the position indicated and by using groupings at X which are relatively stable or unreactive to the active hydrogens present in proteins it will be seen that the reaction between the modifying reactant and protein does not achieve any appreciable cross-linking. This is in direct contrast to chemical reactions which cross-link proteins through terminal or nonterminal groups as disclosed, for example, in U.S.P. 2,882,250.

Finally, it should be pointed out that for each proteinaceous material being treated, there is a definite limit to the quantity of modifying reactant which will react with the material. This appears, then, to offer further indication that certain specific groups, and only certain specific groups, add to the Y grouping under the reaction conditions.

Among the modifying reactants which may be used, those which are preferred as derivatives of glycidyl ether having the general formula

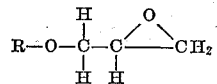

wherein R may be an unsubstituted aryl grouping such as phenyl; a substituted aryl grouping such as 2,4-dichlorophenyl, o-methylphenyl, p-nonylphenyl, tertiarybutyl phenyl, p-methoxyphenyl; and straight chain or branched alkyls, such as butyl and hexyl or isopropyl. Of these the phenyl glycidyl ether and the phenyl glycidyl ether wherein the substituent on the phenyl radical is chlorine or a short chain aliphatic are preferred for making thermoplastic animal-derived glues. As will be apparent from the examples given, to treat these glues with phenyl glycidyl ether results in the production of a modified glue having a softening point of 95° C. and a coalescing temperature of 143° C. The term "coalescing temperature" is used to indicate that temperature at which the material has a viscosity suitable for hot melt coating. This means that such a modified glue may be applied as a hot melt at its coalescing temperature or higher but below that at which it is thermally degraded. Preferably, a coating temperature of between about 145 and 150° C. is used.

As noted above and as will become apparent in the examples, the R grouping has an influence on the ultimate change in physical properties of the treated proteinaceous materials. These changes in physical properties are most generally manifested in decreased softening points and decreased water solubility. The effect on softening points and actual conversion of glues to thermoplastic materials will be illustrated in the examples below. A marked change in water solubility may be illustrated in the fact that glues normally considered water soluble (usually at elevated temperatures) are, by the process of this invention, converted to glues which can be dispersed or swelled but not dissolved in water. They have, in addition, the interesting property of being able to absorb a specific quantity of water, but no more. This marked decrease in water sensitivity is of particular interest in modifying materials such as casein, zein, soya and keratins as described below.

As noted above, for each proteinaceous material there is then an upper limit to the amount of reactant which can be introduced, this upper limit for glues for example ranging from between about 30 and about 55% by weight of the glue on a dry basis. No more than this particular quantity can be introduced into the glue no matter how long the reaction is carried out. For most purposes it is desirable to introduce the maximum quantity of the reactant into the glue and this can normally be done by using an excess of the reactant and carrying out the reaction until no further quantity of the reactant is taken up.

OTHER ADDITIVES

It may be desirable to further change or otherwise alter the physical or chemical characteristics of the modified materials to impart certain properties to it for specific uses. The modified glues of this invention, for example, have been found to be compatible with an extremely wide range of additives. Thus, for example, if it is desirable to obtain plasticity in the glue film, plasticizers such as glycerine, urea, glycols, amines, amides, fatty acids, sulfonamides, resins (modified and unmodified) waxes and the like may be incorporated to achieve the desired degree of plasticity.

Inasmuch as the modified glues tend to be somewhat hygroscopic it may be desirable to add an anti-blocking plasticizer such as stearic acid to them so that when label stock, for example, is coated with the adhesive it may be stacked for cutting, perforating, printing and the like without experiencing any undue blocking. Likewise, extenders and diluents may also be added. It is also, of course, within the scope of this invention to formulate glue compositions having more than one of these additives.

The quantity of these additives will depend upon the modified glue system as well as upon the degree of plasticity, anti-blocking or other characteristics required in the final product. Thus, it is possible to add up to about 20–30% of plasticizer while still retaining the heat-activatable, water-activatable characteristics of the modified glue. A number of examples of additives and the amounts in which they are used are given below.

METHOD STEPS

The reactant used to modify the protein-containing material, in accordance with the process of this invention, is introduced into the material in the presence of water. If the proteinaceous material is soluble in water at the reaction temperature used, then it is preferably dissolved in water prior to the addition of the modifying agent. If, however, it is not soluble, or not easily soluble, then it may be reduced to a finely divided state and dispersed in water; or, as in the case of keratin fibers or bristles, it may be immersed in water during the treating with the modifying reagent, or the fibers may be first soaked in water and then treated after removal from the water.

If the proteinaceous material is soluble in water, as glue is, then the aqueous solution preferably contains about 50% solids by weight although this not a critical concentration and may vary over a fairly wide range. It will, however, be desirable to work with the greatest concentrations commensurate with the viscosity of the solutions which can be conveniently handled in the apparatus since it is preferable to have a minimum quantity of water to remove in the final drying step required to produce a dry modified material.

Although it is possible to use glue or gelatin in the dry powdered form in which it is normally sold in commerce and to add water to it to form the solution for reaction, in commercial operation the glue need not be dried but may be treated as it comes from the vats in which it is processed. Thus there need not be a drying step in the glue making since the water removed must only be replaced to form the solution. If dry powdered material is used, then it is dissolved in water with heating, e.g., up to about 85° C.

The reactant is added to the warm solution of glue or gelatin with sufficient agitation to insure thorough mixing throughout the solution. After the addition of reactant is completed the solution containing the dispersed reactant is maintained at the reaction temperature until no further reaction takes place, that is until no further reactant is taken up by the protein-containing material. Normally, this will be of the order of about six hours. The temperature of reaction should, of course, be less than that at which thermal degradation of the material being treated occurs, for example, below about 200° C. for glue. Preferably the reactant temperature should range between about 70 and 90° C. for glue or gelatin.

Proteinaceous materials such as casein, zein, and soya protein are usually available in the finely powdered state and are not soluble in water. They are, however, dispersible in water and can be reacted as a water dispersion. A reaction temperature of from about 70 to 85° C. is suitable for these materials. Proteinaceous materials such as keratin fibers and bristles which must retain their physical identity and form are immersed in a water dispersion of the modifying agent which is maintained at a temperature of about 70 to 85° C.

The rate of reaction is a function of temperature so that these two conditions may be adjusted for any one material being treated. Normally, of course, the higher the temperature the less the reaction time within the limits noted above. The amount of reactant used is preferably slightly in excess of that required to react completely with the glue or gelatin. This, as noted above, can be determined by simple experimental runs for each of the systems under treatment. Since most glues and gelatins after reaction contain approximately 30–45% by weight of reactant it is preferable to use about 50% by weight, thus supplying a small excess to insure complete reaction.

It has not been found necessary or desirable in most of the reactions to make any adjustment in the pH of the reacting system. Of all the examples given below, it was found desirable in only one (Example 25) to raise the pH to about 8 in order to cause the reaction to proceed at a satisfactory rate.

If the reaction has been carried out in a water solution or dispersion of the proteinaceous material, the water and excess reactant are removed by drying and the resulting dry material reduced, if desired, to some selected particle size. Glues and gelatins are conveniently ground to a finely divided state, but may of course be pelletized, tableted or the like. If the reaction has been carried out while the proteinaceous material (e.g., bristles) were immersed in water, then it need only be removed from the water, washed and dried. All drying is, of course, carried out at temperatures suitable for the modified material. For example, if the treated material is thermoplastic it may not be desirable to melt it in drying. In any event the drying temperature should be below that at which any appreciable thermal degradation is experienced by the resulting modified proteinaceous material.

If other additives are to be compounded into the modified materials they may be introduced subsequent to the completion of the reaction but before the water and excess reactant are removed. They may also be added after the modified proteinaceous material has been dried. This may be done by melting the proteinaceous material if it is thermoplastic or by passing all of the constituents through a compounding extruder. Any other technique may be used which achieves thorough and uniform physical blending.

*Examples*

In preparing all of the examples given below the glues, gelatins, casein, zein and soya protein were received in a dry particulate state in the form in which these materials are normally sold in commerce. Solutions of the glues and gelatins and dispersions of the casein, zein and soya protein were prepared prior to their being treated with the reactants indicated. This was done by adding sufficient water to give a concentration of about 50% solids content. In all cases the solutions or dispersions were warmed to about 70° C. and maintained at this temperature during reaction which was carried on for six hours. The hog bristles were immersed in water at 70° C. and treated while in the water. The modifying reactants were dispersed in the solutions or dispersions of the proteinaceous materials.

The first set of examples is directed to illustrating the wide variety of glues which may be treated in accordance with this invention; the second set to gelatins; and the third set of examples to other protein-containing materials. The fourth set of examples illustrates a number of different reactants which may be used to treat glue. These examples illustrate the various substituents which may be present as the R portion in the formula defining the reactants as well as the use of —O— and —CH$_2$— as X in the formula. Finally, the fifth set of examples illustrates the use of other additives such as extenders, plasticizers and anti-blocking agents as well as typical hot melt glue formulations, and their application to various types of materials to which the resulting glue film can adhere. Since the experimental method in all of the examples was that described above, data are tabulated for clarity of presentation.

In the following examples illustrating the various types of glues which may be modified the reactant was phenyl glycidyl ether and it was added in an amount equivalent to about 50% by weight of the glue, unless otherwise specified. The designations used in the tabulation to describe the various glues are those commonly used in the glue industry.

The effect of the treatment of this invention is stated in terms of a softening point temperature and a coalescing temperature, the latter being that temperature at which the modified glue or gelatin becomes a viscous liquid suitable for coating as a true hot melt. This coalescing temperature is characteristically somewhat above a true melting point of the material. It is, however, indicative of the temperature at which it becomes a hot melt coating.

It should be remembered that unmodified animal glue is not thermoplastic, nor does it become soft at a temperature below that at which it experiences thermal degradation—normally about 200° C. Therefore the showing of softening and coalescing points for the modified glues clearly indicates a physical and/or chemical change in the glue, for the resulting modified glues may be converted to a tacky state or may be converted to a liquid state without thermal degradation.

It has been noted that in reacting glue with the glycidyl ethers a small amount of the corresponding glycol is formed as a by-product. For example, when phenyl glycidyl ether is used a minor amount of $$C_6H_5OCH_2CHOHCH_2OH$$

is formed which serves as a plasticizer for the resulting modified glue.

TABLE I.—TYPES OF GLUES

| Example No. | Type of Glue | Softening Temp., ° C. | Coalescing Temp., ° C. |
|---|---|---|---|
| 1 | Extracted Bone (defoamed) 217 gms.,[1] pH 6.0. | 110 | 155 |
| 2 | Green Bone (defoamed) 200 gms., pH 5.8–6.2. | 110 | 155 |
| 3 | Low ash magnesite chrome | 105 | 155 |
| 4 | Low ash chrome split | 100 | 148 |
| 5 | Low ash (hide, fleshing chrome splits) | 103 | 160 |
| 6 | Low ash limed hide | 105 | 148 |
| 7 | Hide, refined | 98 | 148 |
| 8 | Hide, commercial grade: | | |
|  | (a) 60% reactant added, 51% pickup. | 85 | 125 |
|  | (b) 33% reactant content by glue weight. | 95 | 143 |
|  | (c) 20% | 165 | 178 |
|  | (d) 10% | Not thermoplastic | |

[1] Jelly value measured on a Bloom gelometer. Value is weight in grams required to depress a flat plunger ½ in. in diameter 4 mm. into a test jelly, which is prepared by dissolving 7.5 grams of the material in 105 grams of water in 15 minutes at 60° C, and aging in constant-temperature bath for 18 hours at 10±0.1° C.

The data in Table I show that essentially all types of glues may be modified with the reactants of this invention. Moreover, it illustrates that the resulting modified glues have coalescing points well within the range of temperatures which permit them to be applied as hot melt adhesives or films. It will be seen, moreover, that these experience a conversion to the liquid state well below the 200° C. temperature at which glue normally chars and is degraded. The data of Table I also show that it is necessary, if a thermoplastic material is to be formed, to add the modifying reactant in an amount equivalent to at least about 15 to 20% by weight of the glue and that it is preferable to add a sufficient quantity of the reactant to complete the reaction which takes place.

Table II shows a number of types of gelatins which may be treated in accordance with this invention. The modifying reactant was phenyl glycidyl ether. As in the case of the glues, reported in Table I, each of the modified gelatins has a softening and coalescing point well within the usable range for hot melt application and well below the normal temperatures at which the gelatin would usually be degraded. Thus it is clearly shown that the gelatin in the reaction experiences chemical and/or physical changes giving it characteristics which it heretofore did not possess.

TABLE II.—TYPES OF GELATINS

| Example No. | Type of Gelatin | Softening Temp., ° C. | Coalescing Temp., ° C. |
|---|---|---|---|
| 9 | Porkskin, 75 gms.[1] | 110 | 170 |
| 10 | Porkskin, 230 gms | 112 | 175 |
| 11 | Edible calfskin | 95–105 | 165 |

[1] Jelly value.

The data in Table II further illustrates the fact that this method of modifying gelatins is applicable to gelatins having widely varying jelly values.

Table III illustrates the applicability of this process to proteinaceous materials other than collagens. The procedures of treatment were those described above and the modifying reactant was phenyl glycidyl ether.

TABLE III.—OTHER PROTEINACEOUS MATERIALS

| Example No. | Proteinaceous Material | Remarks |
|---|---|---|
| 12 | Casein | Insoluble in ammoniacal solutions; lowered softening point from 210° C. to 125° C. |
| 13 | Zein | Insoluble in aqueous alcohol; lowered softening point from 195° C. to 80° C. |
| 14 | Soya protein | Insoluble in ammoniacal solutions; lowered softening point from 205° C. to 105° C. |
| 15 | Pig Bristles (keratin). | Decreased water absorptivity and sensitivity; increased stiffness. |

The treatment of these proteinaceous materials with a substituted glycidyl ether brought about marked changes in their physical and chemical properties as noted in the "Remarks" in Table III. It should be noted in connection with these results that unmodified casein and unmodified soya protein are readily soluble in ammoniacal solutions, while unmodified zein is soluble in aqueous alcohol. In using unmodified casein, soya protein and zein it is often necessary to tan them to render them less soluble. The modified casein, soya protein and zein of this invention offer the possibility of eliminating this tanning.

The treatment of this invention has several important effects on keratinous materials, and particularly on keratin fibers or filaments as represented by the hog bristles in Example 15. Keratinous materials in filament form are used extensively in all manner of brushes, i.e., paint brushes, artists' brushes, tooth brushes, hair brushes and the like. Typically, the filaments are hog bristles, cattle hair or hair from squirrels, badgers, sable and the like. In many applications it is highly desirable to be able to use very fine bristles or filaments but these prove to be too soft to be practical. Moreover, in other applications where such brushes come in contact with water or aqueous liquids they tend to lose their natural stiffness and become soft. To overcome these inherent disadvantages, filaments or natural bristles of greater diameters are used. This, however, means that in many cases it is more difficult to apply a smooth coat or a fine line or to use water-based paints. The treatment of this invention overcomes these disadvantages of using keratin filaments in brushes by stiffening the individual filaments and also by rendering them less sensitive to water. Thus filaments treated by this method can be used in finer sizes for any kind of paint application, and they can also be used to greater advantage with water-based paints.

The data in Table IV are directed to illustrating various modifying reactants which may be used as the reactant in the invention. The proteinaceous material treated to obtain the data of Table IV was the commercial grade hide glue of Example 8 of Table I. In each example, 100 grams of the glue was treated with 50 grams of modifying reactant which was present in an excess of that required to achieve complete reaction.

TABLE IV.—MODIFYING REACTANTS

| Example No. | Reactant | Softening Temp., ° C. | Coalescing Temp., ° C. | Remarks |
|---|---|---|---|---|
| 16 | Phenyl glycidyl ether | 95 | 143 | Thermoplastic. |
| 17 | 2,4-dichlorophenyl glycidyl ether | 150 | 190 | |
| 18 | o-Methylphenyl glycidyl ether | 160 | 180 | |
| 19 | p-Methoxyphenyl glycidyl ether | 150 | 190 | |
| 20 | p-Tertiarybutylphenyl glycidyl ether. | Property changes but no thermoplasticity observed. | | |
| 21 | p-Nonylphenyl glycidyl ether | | | |
| 22 | Isopropyl glycidyl ether | 130 | 160 | Thermoplastic. |
| 23 | Butyl glycidyl ether | Property changes but no thermoplasticity observed. | | |
| 24 | Hexyl glycidyl ether | | | |
| 25 | 1,2-epoxy-4-phenylbutene [1] | 110 | 160 | Thermoplastic. |

[1] Sufficient triethyl amine was added to give glue solution a pH of 8.

It will be seen from this table that phenyl glycidyl ether (Example 16) and a number of substituted phenyl glycidyl ethers (Examples 17–19) imparted true thermoplastic characteristics to the glue. Likewise isopropyl glycidyl ether (Example 22) and 1,2-epoxy-4-phenylbutene (Example 25, where X is —$CH_2$—) converted the glue to a thermoplastic material. The remaining reactants contributed to property changes of the glue but no thermoplasticity was observed. If a truly thermoplastic hot melt adhesive is to be made from glue then it is preferred to use the phenyl glycidiyl ether or one of the substituted phenyl derivatives.

Finally Table V illustrates eight typical formulations comprising a glue modified in accordance with this invention and one or more additives to form hot melt compositions having added degrees of plasticity or anti-blocking characteristics.

TABLE V.—HOT MELT GLUE COMPOSITIONS (GLUE OF EXAMPLE 8(a) USED)
[All figures are percent by weight]

| Example No. | Modified Glue | Glycerine | Polyethylene glycol | o- and p-Toluene Sulfonamides | Stearic Acid | Oxidized Rosin | Coumarin-Indene Resin |
|---|---|---|---|---|---|---|---|
| 26 | 80 | 20 | | | | | |
| 27 | 75 | | 25 | | | | |
| 28 | 80 | 7 | | | 13 | | |
| 29 | 78 | | 9 | | 13 | | |
| 30 | 80 | | | 20 | | | |
| 31 | 75 | | | 10 | | 15 | |
| 32 | 70 | | | 10 | | | 20 |
| 33 | 78 | | 9 | | 13 | | Water 5 |

Glue modified as in Example 8(a) or 8(b) was readily applied as a true hot melt at 145° C.; while all of the compositions of Table V could readily be applied as true hot melt adhesives at temperatures somewhat below this. Although all of these glues can be converted to a liquid of a coatable viscosity without any solvent or other liquid being added to them, it has been found that the addition of a small amount of water, up to about 5% (Example 33), prior to melting, decreases the temperature at which a coatable viscosity is attained. Since the coalescing temperature can in this way be reduced to below 100° C. it is possible to formulate thermoplastic glues which can be converted to a hot melt at normal steam temperatures. This offers material advantages in application.

The modified glues prepared in accordance with this invention can be coated onto many different types of substrates including label stock, plastics, gumming kraft, leather, cloth, aluminum foil, glass and the like and they form excellent bonds with these materials. The glues once applied may be activated by moisture application (even though they are no longer water-soluble) by heat or by a combination of these.

It will be seen from the above description and examples that this invention provides a method for modifying proteinaceous materials as well as the resulting modified materials having properties heretofore not associated with proteinaceous materials. The properties thus imparted to these materials in turn make them available for new uses.

It will thus be seen that the objects set forth above, among those made apparent from the preceding description, are efficiently attained and, since certain changes may be made in carrying out the above method and in the articles set forth without departing from the scope of the invention, it is intended that all matter contained in the above description shall be interpreted as illustrative and not in a limiting sense.

I claim:

1. Method of modifying proteinaceous material, comprising the steps of
    (a) introducing a protein-containing material into water;
    (b) adding to said water and protein-containing material a reactant characterized by having a single group reactive with active hydrogens in the protein of said protein-containing material and consisting essentially of a substituted glycidyl ether of the formula

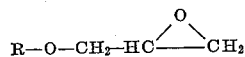

wherein R is selected from the group consisting of aryl, substituted aryl and alkyl, in an amount equivalent to at least 15% by weight of the protein in said proteinaceous material; and
    (c) maintaining said reaction mixture at an elevated temperature between about 70° C. and 200° C. for a time sufficient to substantially complete the reaction between said protein-containing material and said substituted glycidyl ether as evidenced by the cessation in the consumption of said substituted glycidyl ether.

2. Method in accordance with claim 1 wherein said protein-containing material is casein.

3. Method in accordance with claim 1 wherein said protein-containing material is zein.

4. Method in accordance with claim 1 wherein said protein-containing material is soya protein.

5. Method in accordance with claim 1 wherein said protein-containing material is keratin.

6. Method in accordance with claim 5 wherein said keratin is in the form of bristles.

7. Method of modifying a collagen-containing material, comprising the steps of
    (a) dissolving said collagen-containing material in water;
    (b) uniformly dispersing into the resulting solution a reactant characterized by having a single group reactive with active hydrogens in said collagen and consisting essentially of a substituted glycidyl ether of the formula

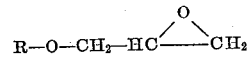

wherein R is selected from the group consisting of aryl, substituted aryl and alkyl, in an amount equivalent to at least 30% by weight of said collagen to form a reaction mixture; and
    (c) maintaining said reaction mixture at a temperature between about 70° C. and 90° C. for about six hours.

8. Method in accordance with claim 7 wherein said collagen-containing material is glue.

9. Method in accordance with claim 7 wherein said collagen-containing material is gelatin.

10. Method in accordance with claim 7 wherein said substituted glycidyl ether is phenyl glycidyl ether.

11. Method of forming a thermoplastic glue suitable for hot melt application, comprising the steps of
    (a) dissolving glue in water;
    (b) uniformly dispersing into the resulting solution a reactant characterized by having a single group reactive with active hydrogens in said glue and consisting essentially of a substituted glycidyl ether of the formula

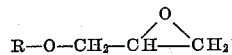

wherein R is selected from the group consisting of phenyl, 2,4-dichlorophenyl, o-methylphenyl, p-methoxyphenyl, and isopropyl, in an amount equivalent to at least 30% by weight of said glue to form a reaction mixture;
    (c) maintaining said reaction mixture at a temperature between about 70 and 90° C. for about six hours; and
    (d) drying to remove substantially all of said water and any excess of said substituted glycidyl ether to form a thermoplastic glue.

12. Method in accordance with claim 11 including the step of incorporating into said modified glue an additive which is a plasticizer for said modified glue.

13. Method in accordance with claim 11 including the step of incorporating into said modified glue an additive which is an anti-blocking compound for said glue.

14. As a new article of manufacture, a modified collagen-containing material prepared in accordance with the method of claim 7.

15. Article in accordance with claim 14 wherein said collagen-containing material is animal glue.

16. Article in accordance with claim 14 wherein said collagen-containing material is gelatin.

17. A thermoplastic adhesive suitable for hot melt application, comprising a collagen containing material modified through reaction with phenyl glycidyl ether prepared in accordance with the method of claim 10, a plasticizer, and water up to about 5% by weight of said modified collagen-containing material, the amount of said reacted phenyl glycidyl ether being between about 30 and 55% by weight of said collagen-containing material.

18. A heat-activatable, water-activatable adhesive, comprising a thermoplastic animal glue formed by reaction of said glue with phenyl glycidyl ether in accordance with the method of claim 11, the amount of said reacted phenyl glycidyl ether being between about 30 and 55% by weight of said glue.

References Cited by the Examiner

UNITED STATES PATENTS

| | | | |
|---|---|---|---|
| 922,133 | 5/09 | Goldsmith | 260—117 |
| 925,328 | 6/09 | Goldsmith | 260—117 |
| 2,238,307 | 4/41 | Brother et al. | 106—154 |
| 2,382,764 | 8/45 | Young et al. | 106—136 |
| 2,386,264 | 10/45 | Roberts | 106—125 |
| 2,882,250 | 4/59 | Baker | 260—119 |

ALEXANDER H. BRODMERKEL, *Primary Examiner.*

MORRIS LIEBMAN, *Examiner.*